US008744957B1

(12) United States Patent
Palumbo

(10) Patent No.: US 8,744,957 B1
(45) Date of Patent: Jun. 3, 2014

(54) PREPAID MICROPAYMENTS SOLUTION

(75) Inventor: Michael Palumbo, Morristown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1385 days.

(21) Appl. No.: 10/850,662

(22) Filed: May 21, 2004

(51) Int. Cl.
*G06Q 40/00* (2012.01)

(52) U.S. Cl.
USPC .......................................................... 705/39

(58) Field of Classification Search
CPC .. G06Q 20/10; G06Q 30/0222; G06Q 20/349
USPC .................................................... 705/35–45
See application file for complete search history.

(56) References Cited

U.S. PATENT DOCUMENTS

| | | | | | |
|---|---|---|---|---|---|
| 5,890,137 | A * | 3/1999 | Koreeda | ........................... | 705/26 |
| 6,467,684 | B2 * | 10/2002 | Fite et al. | ....................... | 235/379 |
| 6,581,827 | B2 * | 6/2003 | Welton | ........................... | 235/380 |
| 6,793,135 | B1 * | 9/2004 | Ryoo | ............................. | 235/383 |
| 7,084,416 | B2 * | 8/2006 | Suzuki | ........................... | 250/556 |
| 7,131,582 | B2 * | 11/2006 | Welton | ........................... | 235/380 |
| 7,370,793 | B2 * | 5/2008 | Welton | ........................... | 235/380 |
| 7,440,922 | B1 * | 10/2008 | Kempkes et al. | ............... | 705/39 |
| 7,634,446 | B2 * | 12/2009 | Jones et al. | ...................... | 705/41 |
| 7,739,162 | B1 * | 6/2010 | Pettay et al. | ..................... | 705/35 |
| 2001/0032878 | A1 * | 10/2001 | Tsiounis et al. | ............... | 235/379 |
| 2002/0026418 | A1 * | 2/2002 | Koppel et al. | .................. | 705/41 |
| 2002/0046341 | A1 * | 4/2002 | Kazaks et al. | .................. | 713/182 |
| 2002/0091632 | A1 * | 7/2002 | Turock et al. | ................... | 705/39 |
| 2002/0099667 | A1 * | 7/2002 | Diamandis et al. | ............. | 705/74 |
| 2002/0133467 | A1 * | 9/2002 | Hobson et al. | .................. | 705/64 |
| 2002/0143703 | A1 * | 10/2002 | Razvan et al. | ................... | 705/44 |
| 2002/0194124 | A1 * | 12/2002 | Hobbs et al. | ..................... | 705/39 |
| 2003/0038175 | A1 * | 2/2003 | Welton | .......................... | 235/380 |
| 2004/0111329 | A1 * | 6/2004 | Moore | ............................. | 705/26 |
| 2004/0141601 | A1 * | 7/2004 | Cai et al. | .................... | 379/114.2 |
| 2004/0218741 | A1 * | 11/2004 | Welton | ....................... | 379/114.2 |
| 2005/0021412 | A1 * | 1/2005 | Wilson | ............................ | 705/26 |
| 2005/0033645 | A1 * | 2/2005 | Duphily | ......................... | 705/16 |
| 2005/0067483 | A1 * | 3/2005 | Palumbo et al. | .............. | 235/375 |
| 2005/0130736 | A1 * | 6/2005 | Polak et al. | ..................... | 463/25 |
| 2005/0182720 | A1 * | 8/2005 | Willard et al. | .................. | 705/40 |
| 2005/0203835 | A1 * | 9/2005 | Nhaissi et al. | .................. | 705/39 |

FOREIGN PATENT DOCUMENTS

EP 1037180 A2 * 9/2000

OTHER PUBLICATIONS

"Splash Plastic: Splash Plastic—The Prepaid Internet Card"—signs PayPoint & PayZone as Distribution Partners; M2 Presswire, Coventry: Oct. 6, 2000 p. 1.*

Serva, Sandy, "AT&T: Making cents with Prepaid content cards", Econtent. Wilton: Jun. 2003, vol. 26, iss 6, p. 12, 2 pgs.*

(Continued)

*Primary Examiner* — Mohammad Z Shaikh
(74) *Attorney, Agent, or Firm* — Cantor Colburn LLP

(57) ABSTRACT

An infrastructure and method for making online payments without the use of a credit card is disclosed. The infrastructure includes a prepaid technology module for receiving information related to a purchased pre-paid card. The prepaid technology module stores at least one of a PIN number and a serial number associated with a plurality of pre-paid cards. The infrastructure also includes a user interface for receiving information, from the consumer, related to the purchased pre-paid card, and a digital settlement network for receiving a purchase request from a consumer, the digital settlement network further for authenticating the purchased pre-paid card.

7 Claims, 3 Drawing Sheets

(56) References Cited

OTHER PUBLICATIONS

Morrison, Doug, "Cyber debit cards for net children", Scotland on Sunday. Edinburgh (UK): Sep. 10, 2000, pp. 1-2.*

"AT&T Launches AT&T Prepaid Web Cents Service", PR Newswire [New York], Apr. 1, 2003, pp. 1-4.*

"Splash Plastic: Splash Plastic—The prepaid internet card—signs PayPoint and PAYzone as distribution partners", M2 Presswire. Coventry: Oct. 6, 2000, pp. 1-3.*

* cited by examiner

PREPAID MICROPAYMENTS SOLUTION

BACKGROUND OF THE INVENTION

Online retail environments, allowing the purchase of online content (e.g., a game, music, magazine article, newspaper article, etc.), are rapidly increasing and expanding. Customers making online purchases currently submit credit card information online or call a customer service number to relay credit card information in order for the customer to provide payment for the online purchases. Many customers are wary of submitting personal and/or credit card information online and therefore refrain from making online purchases.

Currently gift certificates or pre-paid gift cards are available for purchase from a brick and mortar retailer. However, the gift cards are utilized for purchasing items in the store and not at the store's internet location online. In many cases, the gift certificate or gift card may only be utilized to purchase items sold at the retailer at which the gift card is purchased. Although credit cards can be used in both a brick and mortar retailer and at many internet retailers, some customers do not want to reveal their credit card information to every internet retailer from which they purchase items or services. Some online services, such as PayPal, allow consumers to "hide" credit card information from internet retailers and also allow consumers to purchase merchandise from them. Still, a consumer must enter the credit card information online, then the information is hidden from retailers, which may not be desirable for some consumers.

Therefore, there is a need for a secure payment option for customers without a credit card or for those reluctant to provide personal and/or credit card information online. There is also a need for a type of gift card that can be purchased at a brick and mortar retailer, but can be used to purchase goods or services from a variety of interne retailers.

BRIEF SUMMARY OF THE INVENTION

The present invention relates to an infrastructure for allowing online purchases with a pre-paid card. The infrastructure includes a prepaid technology module for receiving information related to a purchased pre-paid card. The prepaid technology module stores at least one of a PIN number and a serial number associated with a plurality of pre-paid cards. The infrastructure also includes a user interface for receiving information, from the consumer, related to the purchased pre-paid card, and a digital settlement network for receiving a purchase request from a consumer, the digital settlement network further for authenticating the purchased pre-paid card.

In another aspect, the present invention relates to a method for making an online payment with a pre-paid card. The method includes activating a purchased pre-paid card at an infrastructure, receiving information related to the pre-paid card for making an online purchase, determining if the pre-paid card is authentic, and allowing release of a requested item upon a determination that the pre-paid card is authentic.

BRIEF DESCRIPTION OF THE DRAWINGS

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE INVENTION

To alleviate the need for transmitting credit card and/or personal information online in order to make an online purchase, embodiments of the present invention relate to allowing a consumer to purchase a pre-paid card at a brick and mortar retailer ("a retailer"). The consumer may then utilize the pre-paid card at one or more participating online retailers or service providers to make purchases without having to submit credit card or personal information.

Exemplary embodiments of the present invention may provide pre-paid cards for multiple distinct content providers simultaneously. All the pre-paid cards may be validated and purchases related thereto are settled via an exemplary infrastructure set forth below. This allows multiple separate and distinct content providers to take advantage of cost savings associated with subcontracting out their online-content pre-paid cards to a single pre-paid card service provider.

Figure 1:
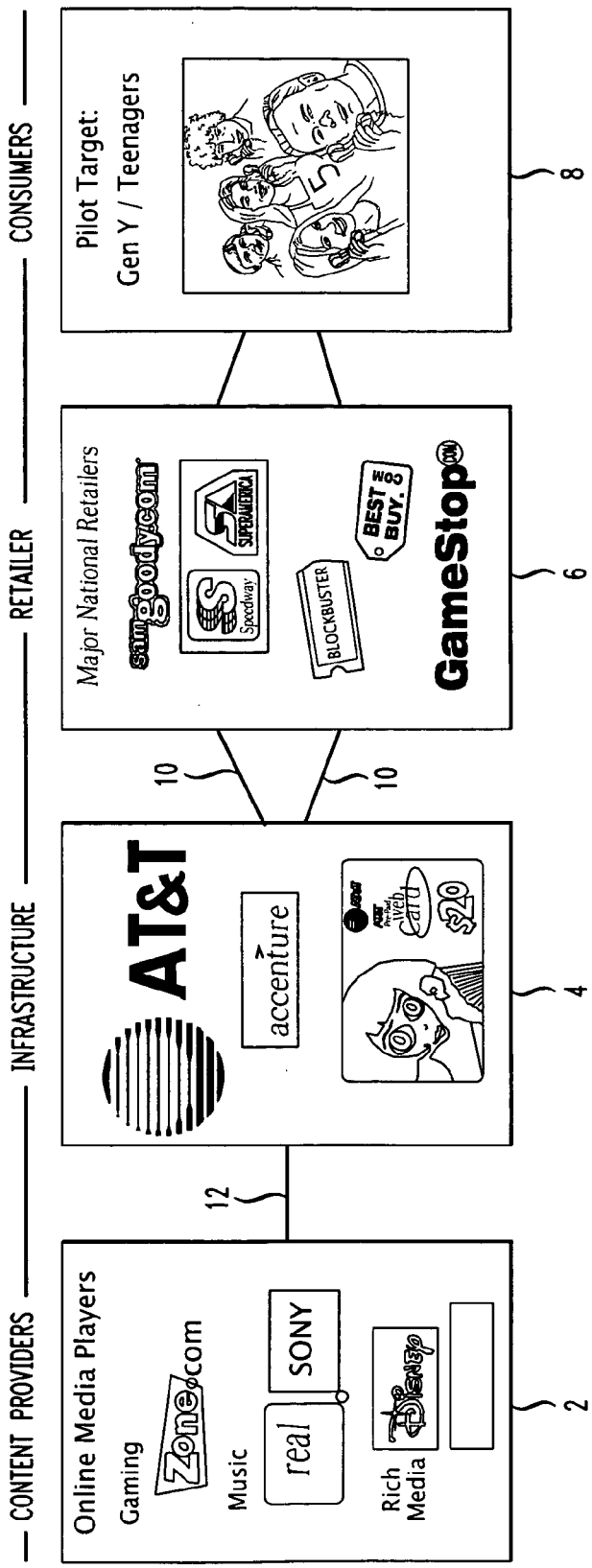
FIG. 1 is a flow diagram illustrating communication in accordance with an embodiment of the present invention.

Referring now to FIG. 1, a block diagram illustrating communications in accordance with an embodiment of the present invention is shown. Content providers 2 provide services or items for purchase by a consumer 8. For example, a content provider 2 may be a gaming provider, music provider, media provider, electronic device provider, etc. and the content available for purchase may be music, games, media, articles, electronic devices, etc. The content providers 2 communicate with an infrastructure 4 via line 12. The content providers 2 may communicate by a data connection via the Internet or a direct communications link between the content provider 2 and the infrastructure 4, although any communication vehicle is possible. The infrastructure 4 provides PIN management, database management, interfacing between the content provider 2 and the infrastructure 4, interfacing between the infrastructure 4 and a retailer 6, and an authentication process. As such, the infrastructure 4 creates a link between the content providers 2 and a retailer 6. The retailers 6 (e.g., Blockbuster, Best Buy, GameStop, etc.) may sell the pre-paid cards for a variety of content providers 2. A consumer 8 may purchase the pre-paid card with cash, credit card, check, etc. at the retailer 6, thus allowing a consumer 8, without the use of a credit card, to purchase online content. Once purchased, the pre-paid card is activated by the infrastructure 4.

For example, a consumer 8 may purchase a music card at the retailer 6 in order to download music online at the content provider 2 website (e.g., realplayer.com, sony.com, etc.). Alternatively, a user may purchase another type of pre-paid card, such as a game card. The game card allows a consumer 8 to play a predetermined number of games or to have a predetermined time allotment (e.g., one month or 15 hours) to play games at a specific website such as DISNEY.

The consumer 8 may, after activation, purchase the online content with the pre-paid card. The consumer 8 enters information related to the pre-paid card which is then transferred, via line 12, to the infrastructure 4. The infrastructure 4 validates the consumer entered information with the information provided by the retailer 6. If the infrastructure validates the pre-paid card, then the online content is forwarded from the content provider 2 to the consumer 8.

Each pre-paid card allows the consumer to request the specific goods purchased at the retailer 6. In other words, the game card may not allow the consumer to make purchases other than those specified by the game card. In this way, a consumer is prevented from purchasing content other than that which was intended to be purchased. For example, a DISNEY game card may not be utilized to purchase content other than games at the DISNEY website (e.g., stuffed animals, t-shirts, music, etc.). In addition, the DISNEY game card may not be utilized to purchase games at websites other than DISNEY.

Figure 2:
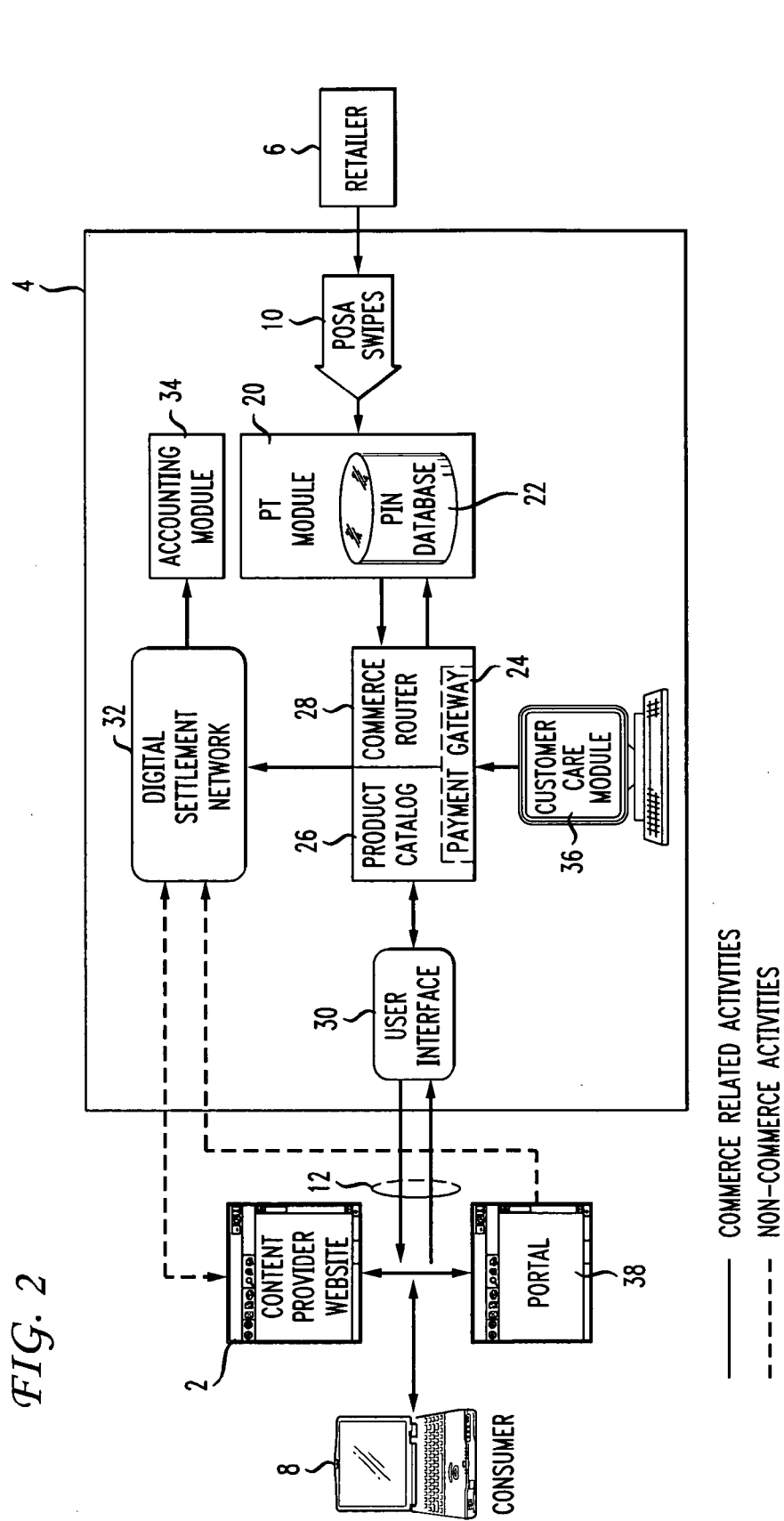
FIG. 2 is a block diagram of an infrastructure in accordance with an embodiment of the present invention.

Referring now to FIG. 2, a block diagram of a system implementing an embodiment of the present invention is illustrated. When a pre-paid card is purchased at the retailer 6, information relating to the pre-paid card is transmitted or communicated to the infrastructure 4 via line 10. The information transmitted from the retailer 6 alerts the infrastructure 4 that the particular pre-paid card has been purchased and therefore should be activated. A Prepaid Technology (PT) module 20 of the infrastructure 4 receives the information relating to the pre-paid card and also stores PIN numbers in a PIN database 22 of the PT module 20. When the PT module 20 receives the information relating to a particular purchased pre-paid card, the PIN database 22 is searched for the PIN associated with the particular pre-paid card and the PIN is activated.

Also included within the infrastructure 4 is a payment gateway 24 that interfaces with the PT module 20. The payment gateway 24 includes a product catalog 26 and a commerce router 28. The product catalog 26 stores information related to products of the content provider 2. The information may be cross-referenced with a particular PIN or serial number from the pre-paid card. The commerce router 28 is utilized when the consumer 8 requests online content at the content provider 2 website. The commerce router 28 interfaces between the content provider 2 website and the payment gateway 24.

When a consumer 8 wishes to make a purchase, the consumer 8 utilizes a user interface 30 that communicates with the payment gateway 24. The consumer 8 may enter, at the user interface 30, a PIN number and/or serial number associated with the pre-paid card. After the PIN and/or serial number of the pre-paid card is validated, the commerce router 28 transmits a response to the user interface 30 allowing the requested purchase to take place.

A digital settlement network 32 of the infrastructure 4 keeps track of transactions, such as authentication, balance verification, data transfers, etc. In addition, business rules of particular content providers 2 and/or particular products are stored in the digital settlement network 32. An accounting module 34 receives information from the digital settlement network 32 in order to balance and/or settle accounts utilizing the infrastructure 4.

In addition, the infrastructure 4 may incorporate a customer care module 36 to interface with consumers 8. For example, a consumer 8 may access the customer care module 36 to determine the balance on the pre-paid card, access a transaction history of the pre-paid card, etc. In order to provide information requested by a consumer 8, the customer care module 36 may access the payment gateway 24 which may, in turn, access other portions of the infrastructure 4. Alternatively, the customer care module 36 may retain the information separately, or the information may be accessed directly from various other portions of the infrastructure 4.

The infrastructure 4 may also interface with a portal 38. The portal 38 advertises and markets products, such as the pre-paid cards, and websites of the content providers 2. The consumer 8 may access the websites of the content providers 2 through the portal 38 or the consumer 8 may access the content provider 2 website directly. In addition, the portal 38 may allow consumers 8 to locate a retailer 6 where they may purchase the pre-paid cards. The portal 38 may interface with the digital settlement network 32. Further, the websites of the content providers 2 may have direct access to the Digital Settlement Network via line 40. Direct access allows the content providers 2 to access, in real-time, transactions, such as card activations and card usage.

Figure 3:
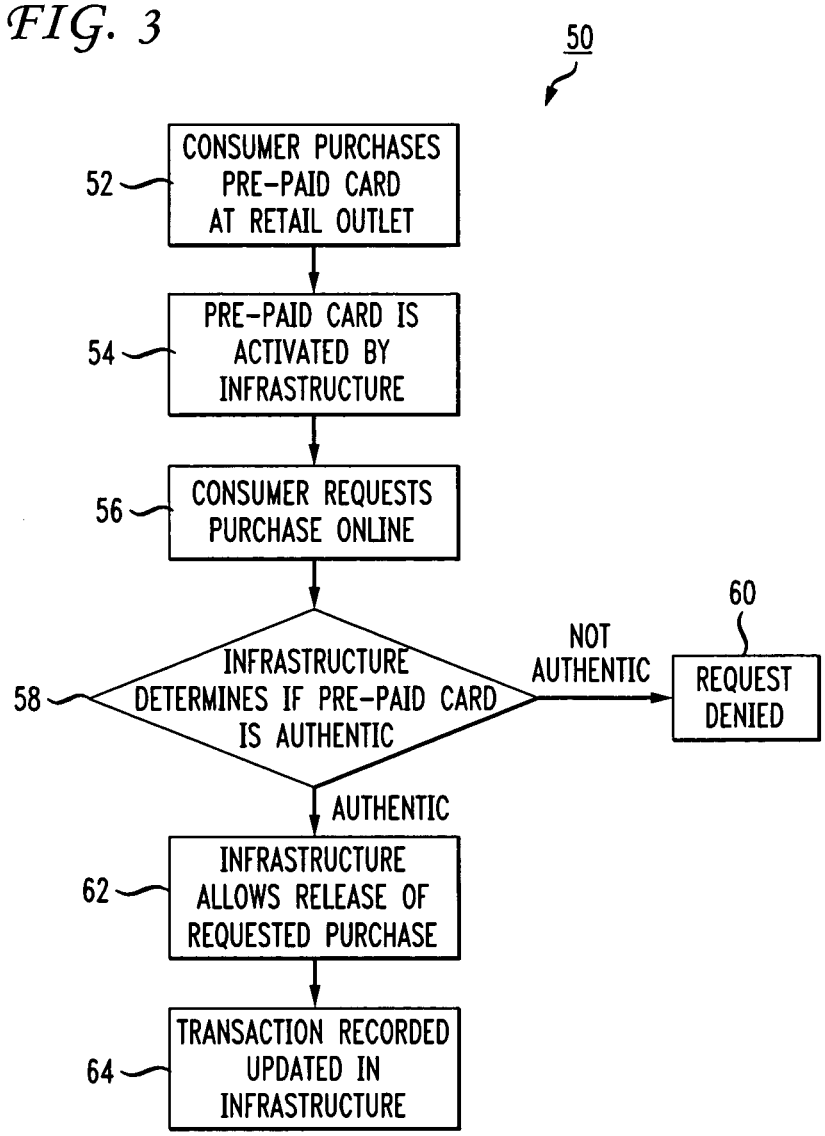
FIG. 3 is a flow diagram illustrating a consumer making an online purchase with a pre-paid card in accordance with an embodiment of the present invention.

Referring now to FIG. 3, a flow diagram 50 for making an online purchase is illustrated. At step 52, a consumer 8 purchases a pre-paid card at a retailer 6. As mentioned above, the pre-paid card may be a music card, a game card, a media card, etc. In addition, the pre-paid card may be distinctly separate from the retailer 6. For example, a retailer 6, such as Best Buy, may sell a pre-paid card from a distinct company such as Sony or GameStop. At step 54, the pre-paid card is activated by the infrastructure 4. At step 56, a consumer may request an online purchase. The infrastructure 4, at step 58, determines if the pre-paid card is authentic. The pre-paid card may be authenticated if the PIN or serial number has been activated, and/or if the pre-paid card is associated with the online content requested by the consumer 8. For example, the pre-paid card may not be authenticated if the consumer 8 attempts to purchase a game with a music card or purchase music that is beyond the credit limits of the pre-paid card. If the pre-paid card is not authenticated, then, at step 60, the request for online content is denied. If the pre-paid card is authenticated, then, at step 62 the infrastructure 52 allows the release of the online content requested for purchase. At step 64, a transaction record may be updated for the pre-paid card.

Embodiments of the present invention and obvious variations thereof are contemplated as falling within the spirit and scope of the claimed invention, which is set forth in the following claims.

What is claimed:

1. A system for allowing online purchases with a prepaid card, the system comprising:
   a computer implemented infrastructure comprising: a prepaid technology module, a customer care module, a payment gateway, and a digital settlement network;
   the prepaid technology module for receiving information related to a purchased pre-paid card, the prepaid technology module storing a number associated with the purchased pre-paid card, wherein the prepaid card is purchased at a retailer;
   a user interface for receiving an online purchase request, directly from a consumer, the online purchase request identifying a particular product requested for purchase using the purchased pre-paid card;
   the payment gateway for interfacing with the prepaid technology module and the user interface and for storing information related to products offered by a content provider;
   the digital settlement network for receiving the online purchase request from the consumer through the payment gateway in communication with the user interface, the digital settlement network further for authenticating the purchased pre-paid card based on predetermined business rules associated with the online purchase request and determining the online purchase request is of a type that is permitted to be purchased using the purchased pre-paid card;
   the customer care module for allowing the consumer to access information related to the purchased pre-paid card; and
   a portal for allowing the consumer to access a website of the content provider;

wherein the prepaid technology module, the user interface, the payment gateway, and the digital settlement network are part of the computer implemented infrastructure separate from the content provider and the retailer;

wherein the payment gateway comprises a product catalog for storing product information associated with the content provider and a commerce router for interfacing between the website of the content provider and the payment gateway;

wherein the portal interfaces with the digital settlement network and the website of the content provider has access to the digital settlement network;

wherein the purchased pre-paid card is not associated with the retailer;

wherein the purchased pre-paid card is usable only with the content provider website.

2. The system of claim 1, further comprising: an accounting module for settling accounts between the consumer and the content provider.

3. The system of claim 1, where in the prepaid technology module comprises a database for storing numbers associated with a plurality of pre-paid cards.

4. The system of claim 1, wherein the purchased pre-paid card comprises at least one of a music card, a game card, a media card, and an article card.

5. The system of claim 1, wherein the content provider comprises a plurality of separate content providers, wherein at least one of the plurality of separate content providers is a music provider, a game provider, a media provider, and an article provider.

6. The system of claim 1, wherein the prepaid technology module receives information related to the purchased pre-paid card from the retailer that sold the purchased pre-paid card.

7. The system of claim 1, wherein the prepaid technology module authenticates the purchased pre-paid card by mapping the received information related to the purchased pre-paid card with information stored in a database.

* * * * *